United States Patent [19]

Kirkham

[11] Patent Number: 5,341,372

[45] Date of Patent: Aug. 23, 1994

[54] PROTOCOL FOR MULTIPLE NODE NETWORK

[75] Inventor: Harold Kirkham, Sunland, Calif.

[73] Assignee: California Institute of Technology, Pasadena, Calif.

[21] Appl. No.: 683,269

[22] Filed: Apr. 10, 1991

[51] Int. Cl.$^5$ ............................................. H04L 12/00
[52] U.S. Cl. ................................. 370/85.8; 370/85.13
[58] Field of Search ................... 370/85.13, 85.14, 16, 370/16.1, 94.3, 85.12, 85.15, 85.8; 359/118, 120, 121, 135

[56] References Cited

U.S. PATENT DOCUMENTS

| | | | |
|---|---|---|---|
| Re. 28,811 | 5/1976 | Pierce | 179/15 AL |
| Re. 33,426 | 11/1990 | Sugimoto et al. | 370/85.14 |
| 3,214,734 | 10/1965 | Whitehead | 340/163 |
| 3,597,549 | 8/1971 | Farmer | 179/15 AL |
| 3,710,026 | 1/1973 | Graham et al. | 179/15 AL |
| 3,731,002 | 5/1973 | Pierce | 179/15 AL |
| 3,732,543 | 5/1973 | Rocher et al. | 340/172.5 |
| 4,015,241 | 3/1977 | Takezoe | 340/147 SC |
| 4,048,446 | 9/1977 | Hafner et al. | 179/15 AL |
| 4,063,220 | 12/1977 | Metcalfe et al. | 340/147 LP |
| 4,099,024 | 7/1978 | Boggs et al. | 178/71 R |
| 4,189,624 | 2/1980 | Mattern | 179/15 AL |
| 4,276,643 | 6/1981 | Laprie et al. | 371/8 |
| 4,390,984 | 6/1983 | Sugiura et al. | 370/88 |
| 4,410,985 | 10/1983 | Yasumoto et al. | 371/22 |
| 4,417,334 | 11/1983 | Gunderson et al. | 370/85 |
| 4,451,916 | 5/1984 | Casper et al. | 370/16 |
| 4,477,807 | 10/1984 | Nakajima et al. | 340/825.44 |
| 4,510,492 | 4/1985 | Mori et al. | 340/825.05 |
| 4,539,679 | 9/1985 | Bux et al. | 370/88 |
| 4,597,078 | 6/1986 | Kempf | 370/94 |
| 4,621,362 | 11/1986 | Sy | 370/88 |
| 4,627,052 | 12/1986 | Hoare et al. | 370/88 |
| 4,672,373 | 6/1987 | Mori et al. | 340/825.05 |
| 4,731,784 | 3/1988 | Keller et al. | 370/88 |
| 4,736,465 | 4/1988 | Bobey et al. | 455/612 |
| 4,811,009 | 3/1989 | Orimo et al. | 340/825.05 |
| 4,829,516 | 5/1989 | Orimo et al. | 370/88 |
| 4,837,856 | 6/1989 | Glista, Jr. | 455/601 |
| 4,866,704 | 9/1989 | Bergman | 370/85.4 |
| 4,879,550 | 11/1989 | Hino et al. | 340/825.05 |
| 4,939,726 | 7/1990 | Flammer et al. | 370/94.1 |
| 4,961,620 | 10/1990 | Uken et al. | 350/96.15 |
| 5,081,621 | 1/1992 | Sugimoto | 370/85.12 |

OTHER PUBLICATIONS

C. Petitpierre, "Meshed Local Computer Networks", *IEEE Communications Magazine*, Aug. 1984, vol. 22, No. 8, pp. 36–40.

N. Hutchinson et al., "The Flooding Sink—A New Approach to Local Area Networking", *Computer Networks and ISDN Systems*, Jan. 1986, vol. 11, No. 1, pp. 1–14.

Tech. Committee on Computer Communications of the IEEE Computer Society, "IEEE Standards for Local Networks: Carrier Sense Multiple Access with Collision Detection (CSMA/CD) Access Method and Physical Layer Specifications", *IEEE Standard 802.3-1985*, Dec. 31, 1984.

Norman C. Strole, "Overview: How IBM addresses LAN requirements with the token ring.", Sy Bederman, Source routing: Controlling message routing is key to interconnection. *Data Communications: McGraw-Hill's Magazine of Distributed Data Processing and Information Networks*, Feb. 1986, pp. 102–127.

Primary Examiner—Douglas W. Olms
Assistant Examiner—Min Jung
Attorney, Agent, or Firm—Robert M. Wallace; Michael L. Keller

[57] ABSTRACT

The invention is a multiple interconnected network of intelligent message-repeating remote nodes which employs an antibody recognition message termination process performed by all remote nodes and a remote node polling process performed by other nodes which are master units controlling remote nodes in respective zones of the network assigned to respective master nodes. Each remote node repeats only those messages originated in the local zone, to provide isolation among the master nodes.

8 Claims, 5 Drawing Sheets

PROTOCOL FOR MULTIPLE NODE NETWORK

ORIGIN OF THE INVENTION

The invention described herein was made in the performance of work under a NASA contract, and is subject to the provisions of Public Law 96-517 (35 USC 202) in which the Contractor has elected to retain title.

BACKGROUND OF THE INVENTION

1. Technical Field

The invention is a network of interconnected zones of intelligent nodes which employs a distributed protocol process performed by all nodes and a polling process performed by nodes which are master or substation units.

2. Background Art

Data communication in a topologically complex network of intelligent nodes is needed in many applications of current interest. As one of many possible examples, electrical power distribution systems could be operated more reliably or economically if there were more responsive and intelligent monitoring and control mechanisms throughout the system. It is a goal of the invention to provide..a microprocessor-based intelligent monitoring and control device at each node in a communication network which is coextensive with the electrical power distribution system and in which the nodal monitoring/control devices throughout the network communicate with computers in local electrical power distribution substations in the power distribution system. Preferably, various nodes in the network would be co-located with key locations, such as branch points, in the electrical power distribution system. However, it has not seemed possible to realize such a goal due to technical and economic constraints.

One technical constraint is arbitrating among several nodes attempting to communicate simultaneously so as to avoid conflicts among the nodes or collisions of messages from different nodes. This problem is particularly acute when all of the nodes are connected in parallel or share a common channel. One solution would be to individually connect all nodes to a central computer. However, this would be uneconomical and cumbersome for large power distribution systems.

For nodes connected in series, one solution might be to communicate with a given node from another location by sending a message containing an address list of the nodes through which the message is to be serially passed. This technique, however, is unreliable because if any one of the nodes on the list happens to be inoperative or if the link to that node is interrupted, the message cannot reach its destination.

Figure 1:
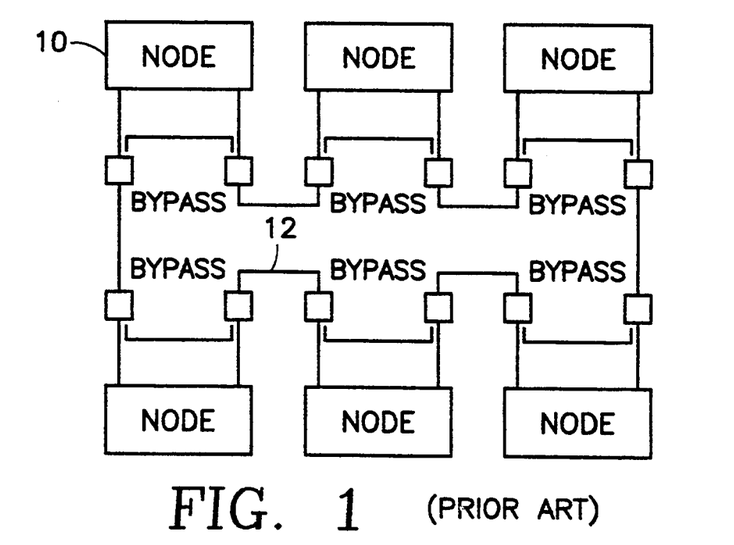
FIG. 1 is a simplified block diagram of a token ring network of the prior art.

Another solution is distributed protocol control. The known technique for this solution requires that all nodes be serially connected in a single ring. Thus, the technique is also susceptible to failure of a single node or interruption of any link between nodes. The technique is illustrated in FIG. 1, which is a block diagram of a token ring network in accordance with the prior art. Each node 10 is a computer which can communicate with any other node 10 in the network via a common communication channel 12. A unique token message circulates around the ring of nodes 10. The token message is recognized by each of the nodes 10. Upon receiving the token, a node wishing to communicate replaces the token with a message on the channel 12. The token is then inserted behind the message, so that other nodes can access the bus. One of the nodes 10 is an active monitor which eventually removes the message to prevent its endless circulation in the ring.

A significant problem is that this simple distributed protocol control will not operate unless the network is a simple ring. Thus, nodal networks comprising multiple interconnected rings of nodes cannot use such distributed protocol control, as will now be described. Unfortunately, it is this very type of network which would be most useful in controlling many types of apparatus, such as electrical power distribution networks.

PROBLEMS TO BE SOLVED BY THE INVENTION

Figure 2:
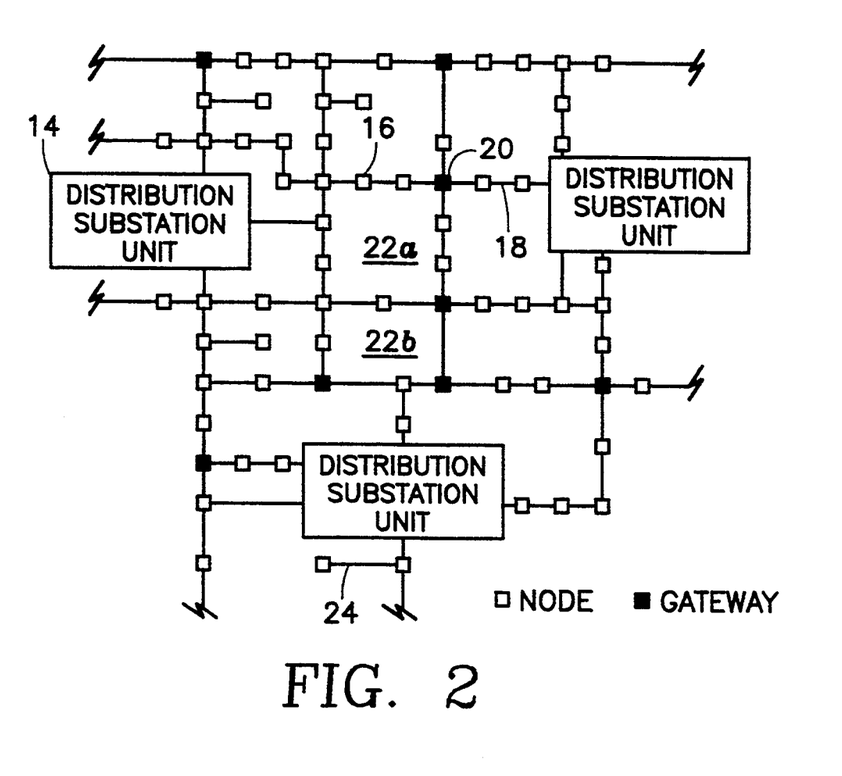
FIG. 2 is a block diagram of one embodiment of the network of the invention.

In order to explain the problems solved by the invention, reference is now made to FIG. 2, which illustrates a communication network embodying the invention. As one example, the communication network of FIG. 2 is particularly advantageous when applied to the monitoring and controlling of an electrical power distribution system. The invention will now be described with respect to this exemplary application. However, it should be understood that other applications of the invention which realize the same type of advantages described herein are possible. In the present example of the application of the invention to electrical power distribution systems, distribution substation master units or master nodes 14 are located at the electrical power distribution substations, intelligent power monitoring/control nodes 16 are dispersed throughout the network and connected together along links or data paths 18 which preferably follow the electrical power distribution lines. Some of the nodes 16 are at intersections between different paths 18 and assure that a message received at an intersection from one intersecting path is transmitted along all other paths radiating from that intersection. The network of FIG. 2 is divided into zones, each zone containing one of the master units 14 and the nodes 16 controlled by the local master unit 14. Gateway nodes 20 (the solid black nodes in FIG. 2) located at each intersection between zones served by different master units 14 are programmed to respond to the different master units. Comparing each node 16 only relays or responds to messages from its local master node 14, thereby providing isolation between zones of the network serving different substation units 14. The topology of the network of FIG. 2 is equivalent to many single ring networks 22a, 22b, etc. interconnected together and sharing common elements. The gateway nodes 20 simply permit messages originated in adjacent zones to travel along common paths of nodes 16 and links 18 shared by the two adjacent zones even though the zones are isolated from one another.

One problem with attempting the distributed protocol control of FIG. 1 in the multiple interconnected ring network of FIG. 2 is that some of the nodes 16 could make two copies of each node-enabling token received and transmit them to two adjoining rings 22 within a portion of the network served by the same master unit 14. Thus, at any one time, there may be at least two valid tokens circulating in the network, so that collisions of messages simultaneously transmitted from different nodes 16 cannot be avoided, rendering the network practically inoperative. Such an occurrence is highly probable, since the conditions prompting one node to transmit a message (e.g., failure of part of the power distribution network) will most likely obtain simultaneously at other nearby nodes.

Another problem is that the network topology can change upon the failure of one or more of the nodes, so that one or more of the multiple rings may lose its active monitor, in which case a message will circulate forever in the affected ring. Thus, a failure at a key point can render the network inoperative. Therefore, the problem is how to implement distributed protocol control in a multiple ring communication network like that of FIG. 2.

In some localities there has already been significant investment in monitoring communication networks in the electrical power distribution network. The existing communication system may be based on communication by means of radio, telephone or power line carrier. Power line carrier can provide communication to each home served by a feeder and may provide load-control and meter-reading functions, which generally require only low-speed communication. In other systems, the communication is by means of a radio link. Each time a utility wanted to add a distribution automation function to such an arrangement, they had to consider a new communications system for it. They might, for example, have successfully automated the control and monitoring of a distribution feeder by means of a radio system, and then been required to add distribution line carrier (DLC) to perform load management on the same feeder. Probably the radio system did not provide access to all the loads, or it may have been too expensive to modify the control software. Furthermore, the new communications system would be "vertically integrated", meaning that the software, hardware, automation functions and communication functions would be interdependent, and the utility would have to rely on the same supplier to furnish all of these items to assure compatibility. Moreover, the selection of a certain communication system having been made, its features would be fixed, the addition of new functions being precluded by the limited bandwidth of the communication system. In any case, there has been a serious economic impediment.

In existing communication systems using DLC, the data rate is typically a few bits per second so that messages must be broadcast, there being insufficient bandwidth to provide node-to-node addressing. Such low data rates are not compatible with the high data rates required to automate the large power distribution network of FIG. 2. For example, an automated feeder being scanned for data at a reasonable rate (e.g., once every three seconds) would generate about 3000 bits of data per second. In accordance with the present invention, fiber optic cables are preferred for a bit error rate of about $10^{-9}$ with data rates of $10^7$ bits per second. This provides an adequate margin of capability for expansion. While it would seem that a complete implementation of the network of FIG. 2 would require access to each user's home with fiber optic cables, this would not be essential. Low cost versions of power line carrier would be capable of serving small areas of the secondary part of the power system, and permit adequate communications to consumers' premises.

It is an object of the invention to provide a multiple interconnected ring communication network which is inherently reliable and immune to failures of a single node or interruptions of a single link or to the failure of a few nodes or links.

It is a further object of the invention to provide a fiber optic multiple interconnected ring communication network.

It is another object of the invention to provide a distributed protocol control for a multiple interconnected ring communication network.

It is yet another object of the invention to provide a hybrid data communication network for an electrical power distribution which includes high speed data nodes and fiber optic links in the high-voltage primary circuit and non-fiber optic low-speed data links in the low-voltage secondary circuit.

It is a yet further object of the invention to provide a communication network for an electrical power distribution system in which the electrical power distribution automation functions performed by the system are as far as possible independent of the communication functions performed by the system, thus permitting independent and competitive development of new power distribution automation software and hardware which can use the communication system.

It is another object of the invention to provide a data communication network having a voice channel.

It is a still further object of the invention to provide sufficient unused bandwidth to permit the later addition of such independently developed power distribution automation software or hardware after installation of the communication network of the invention.

DISCLOSURE OF THE INVENTION

The invention is a communication network of nodes, each of the nodes including a node processor for relaying messages between others of the nodes. A plurality of links connect the nodes in multiple rings of nodes, the network being divided into plural zones wherein each node responds only to a master node in the local zone. Those nodes located at boundaries between adjacent zones are gateway nodes and respond to master nodes of the adjacent zones, each of the gateway nodes being connected to nodes in adjacent zones of the network. Each node processor performs a distributed protocol for terminating a message if the message or a reply to the message from another node has been previously received or seen at the node. The node processors of the master nodes perform polling by transmitting a message authorizing a particular one of the other nodes in the local zone to transmit a new message, while the node processors in other nodes transmit a new message only upon receipt of the polling message from the local master node authorizing the particular node to transmit a new message. The polling feature permits all control of communication in the network to be concentrated in the master nodes.

In one embodiment of the invention, the network is a hybrid dual network having a high-bandwidth primary network consisting of fiber optic links between the nodes and a low-bandwidth secondary network consisting of non-fiber optic links between certain nodes in the primary network and other nodes outside of the primary network. In a preferred embodiment, an extra fiber optic pair parallels the fiber optic links of the primary network and carries voice communications from hand-held voice units which may be plugged into or coupled to the extra fiber optic cable at periodic locations. In a further preferred embodiment, all of the master nodes are controlled by a supreme control unit at a central location to which the voice carrying fiber-optic cable is connected.

BRIEF DESCRIPTION OF THE DRAWINGS

Preferred embodiments of the invention are described below in detail with reference to the accompanying drawings, of which.

MODES FOR CARRYING OUT THE INVENTION

The problem of controlling communications in the multiple interconnected ring network of FIG. 2 is solved by the distributed protocol process of the present invention. Any node 16 or master unit 14 can transmit a message in the network of FIG. 2. In order to effect the distributed protocol strategy, every message contains a unique identifying number that can be stored in every node 16 that it passes through. Since the operation of the nodes 16 in the separate rings 22 is assumed to be independent, the information required to identify a message uniquely can be based on the source address of the originating node and the time the message was originated, in one embodiment of the invention. This address may either be a logical address or the "street" address of the originating node. Each node 16 has a memory stack in which the identifying numbers of all passing messages are stored for future reference.

At all nodes, any received message is retransmitted on all outgoing lines, unless the message has been seen before, or is addressed to the node in question. Another approach would inhibit the retransmission of a message if the reply to it has already been seen at the node. By adopting such a strategy, a message inserted anywhere into the multiple interconnected ring network of FIG. 2 will be broadcast to all nodes 16. Furthermore, the message will not be repeated by a given node more than once. All links between nodes carry the message exactly once. The process is therefore as economical in operation as a single ring with an active monitor node. It is in some ways more efficient than a method which relies on some central unit working out a route for messages to go from node to node. The method of the invention "floods" the network with the message and chooses the shortest path between the transmitting and receiving locations because it chooses all paths. Transmission delay is therefore minimized. In flooding the network with the message, many copies of the message circulate simultaneously in different ones of the multiple interconnected rings of the network of FIG. 2, and this process propagates throughout the network until every link has passed the message once. As a result of such "flooding", several copies of each message will be received at the destination node.

Because fiber optics are used in the preferred embodiment, communication reliability is so high that error correction is unnecessary. Should a message be corrupted before reaching its destination by one particular path, another "good" copy will arrive over a different path in most cases. Since the several copies of the received message will travel along different paths, interruption of a given path will not prevent arrival of at least one copy of the message. Therefore, reliability is maximized. The network will function even when fibers are broken disconnecting some nodes from one or more their neighbors.

The distributed protocol process of the invention resembles the working of the human body's immune system. The first time a T-cell in the immune system is exposed to an invading organism, it learns to recognize the organism as "non-self". On a second exposure, the T-cell stimulates production of antibodies that kill the invader. In the present invention, the messages are analogous to the invader, and they wander throughout the network of FIG. 2 as far as available communication channels will allow. On first exposure to a message, each node 16 extracts and stores information that will allow it, on a second exposure, to kill the message.

Figure 3:
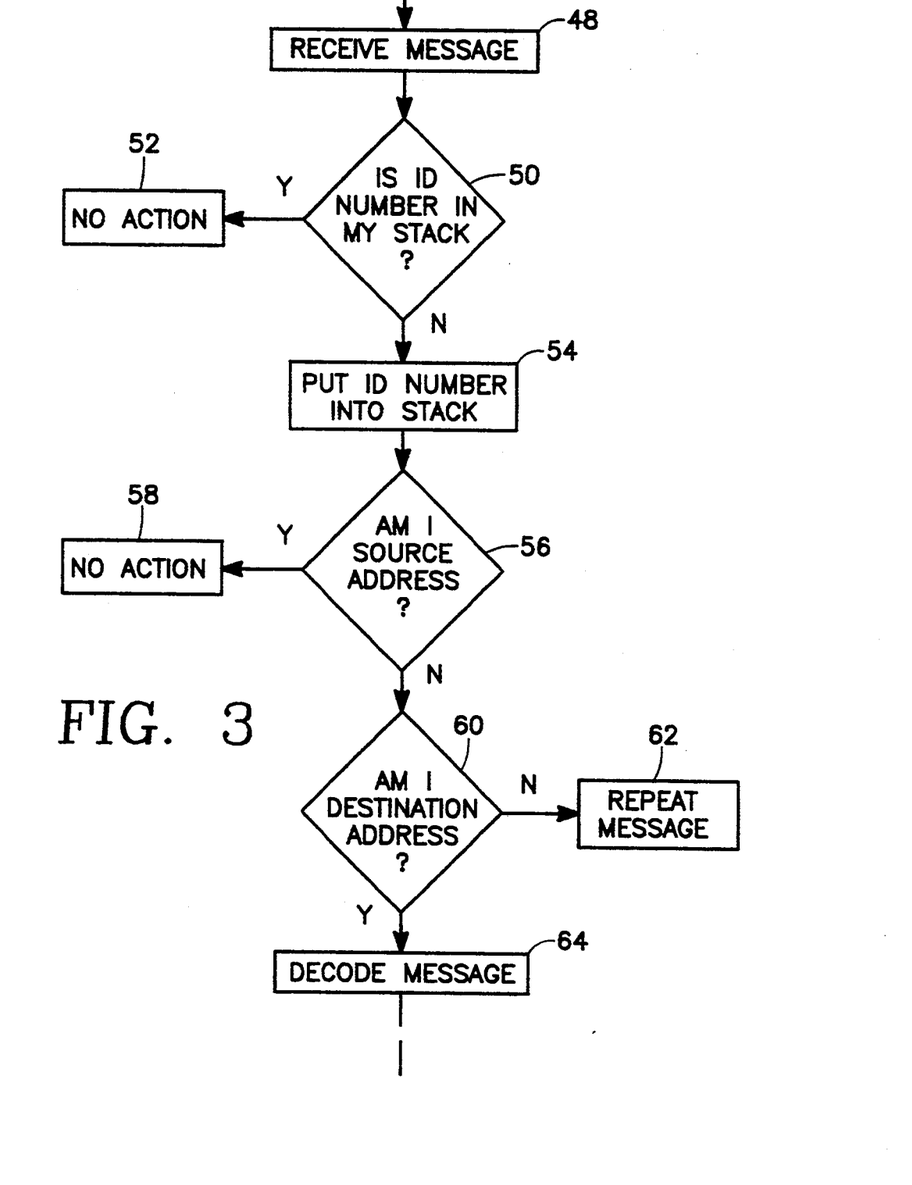
FIG. 3 is a flow diagram illustrating a process performed in the network of FIG. 2.

The foregoing distributed protocol process performed by each node 16 in the multiple interconnected ring network of FIG. 2 is illustrated in FIG. 3. It begins as a message is received by a particular one of the nodes 16 (block 48 of FIG. 3). The node 16 first determines the unique identification number of the received message and whether that same number (or a greater number corresponding to the response to the message) was previously stored in the node's memory (block 50 of FIG. 3). If the node finds the same identification number (or the greater number corresponding to the response to the message) stored in its memory (YES branch of block 50), then the node "kills" the message by not retransmitting it to other nodes and taking no other action with respect to the message (block 52 of FIG. 3). Otherwise (NO branch of block 50), the node copies and stores the message's identification number in a memory stack (block 54 of FIG. 3).

In the remaining steps of the process of FIG. 3, it is assumed that the message includes data bits identifying the location of the message origin as well as its destination in the network of FIG. 2. The node determines whether it is the node which previously originated the received message (block 56 of FIG. 3). If so (YES branch of block 56), the node "kills" the message by taking no further action (block 58 of FIG. 3). Otherwise (NO branch of block 56), the node next determines whether it is the destination of the message (block 60 of FIG. 3). As part of the determination of the step of block 60, the node inquires whether the message is a diagnostic message. If the message is not a diagnostic message and does not bear the destination address of the present node (NO branch of block 60), the node repeats the message to the other nodes in the network (block 62 of FIG. 3). Otherwise (YES branch of block 52), the node decodes the message and responds accordingly (block 64 of FIG. 3). For example, if the message is a diagnostic message, the node performs the tasks required in the message. It should be noted that the steps of blocks 56 and 58 may be unnecessary in some embodiments of the invention where, for example, the network topology is such that the originating node will never receive copies of the messages it originates.

The distributed protocol control process of FIG. 3 permits the use of centralized polling. Each message contains the address of both the originating and destination locations. By programming each node 16 to transmit new data only when it receives a specific request to do so from its local master unit 14, the master unit 14 can sequentially poll all of its local nodes without having to be connected directly to them. This solves the problem of several nodes transmitting different messages which reach the master unit 14 or some other point in the network simultaneously. Such polling is not cumbersome in the network of FIG. 2 because scanning all of the nodes should occupy only a few tens of milliseconds. If the message from one node is 1000 bits long and if there are 100 nodes, a complete scan comprises $10^5$ bits. Using optical fiber links, the anticipated data rate in the network of FIG. 2 is $10^7$ bits per second, so that the time occupied by all the data is $10^{-2}$ seconds. The scan time will be a few times larger than this, since data from each node must be transmitted to another node, error-checked and re-transmitted.

An advantage of polling is that it allows the master unit 14 to allocate communication time dynamically. If a problem is suspected in some portion of the master unit's zone, the master unit 14 can concentrate on the nodes in that portion and relegate the remainder of its assigned nodes to a lower priority.

In accordance with the foregoing polling feature of the invention, the process of generating a message by either a master unit 14 or a node 16 which has received a message requesting transmission is as follows:

1) create information portion of message;
2) append a unique identification number to the message;
3) append the identification of the originating node (or master unit) and the destination node (or master unit); and
4) transmit the message.

Another feature of the invention permits compensation for the loss of one of the master units 14 in the network. Specifically, another master unit (or a unit higher in the control hierarchy) detecting the loss can remotely re-program one or more of the nodes 16 to no longer isolate the zone of the network served by the lost master unit 14. This enables a master unit serving an adjacent zone of the network to take over the monitoring and control of all the nodes in the zone of the lost master unit. In accordance with this feature, each of the nodes 16 may be programmed or re-programmed by a message directed to it from any master unit 14. For example, each node 16 is programmed to re-transmit a received message destined for another node or to respond to a received message destined for the node itself, provided that the message identifies its source as the master unit 14 of the local zone of the node. If failure of the local master unit is detected, the master unit 14 of an adjacent zone can send a message to each of the nodes in the zone of the failed master unit instructing them to begin responding to messages whose source is the adjacent zone's master unit. In order to avoid rejection of such a reprogramming message by the orphaned nodes, the source identification in the message must not identify the new master unit, and, in one embodiment, may falsely identify the source as the failed master unit. Source address translation, if necessary, can be accomplished at the gateway nodes 20.

Figure 4:
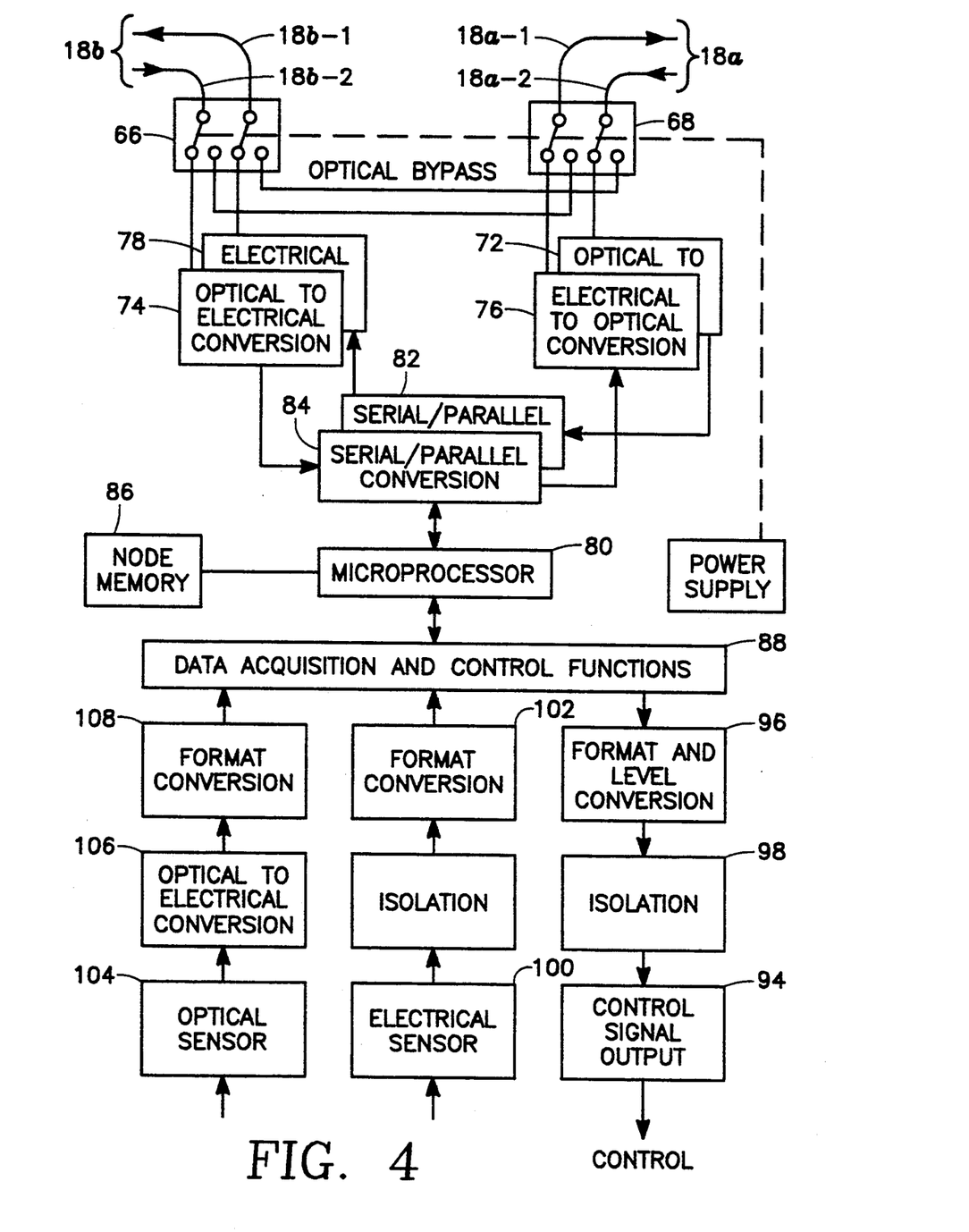
FIG. 4 is a block diagram of a typical node of the network of FIG. 2.

The preferred structure of each one of the nodes 16 is illustrated in FIG. 4. The same structure may also be used to implement each of the master units 14 as well as each of the gateway nodes 20. As mentioned previously herein with reference to FIG. 2, each of the links 18 is preferably an optical fiber link. Each link 18 accommodates two-way traffic and for reasons of economy comprises two optical fibers. The apparatus of FIG. 4 can function as either an ordinary node 16 which is connected to two other nodes 16 via optical links, as an intersection node 16 connected to more than two other nodes via more than two optical links or as a gateway node 20 which is capable of responding to more than one master unit 14 and which (in the embodiment of FIG. 2) is connected to four other nodes 16 via four optical links. Also, if the apparatus is used in a master unit 14, it may be connected to any number of other nodes 16. However, FIG. 4 only shows connections to two bi-directional optical links 18a, 18b comprising outgoing fiber optic cables 18a-1 and 18b-1 and incoming fiber optic cables 18a-2 and 18b-2, respectively, additional links being includable. A set of optical bypass switches 66, 68 enable an incoming message to be relayed directly to the next node. When a node 16 or 20 is in service (i.e., is not bypassed by the message) it acts as a repeater for incoming signals. The advantage of such frequent repetition and boosting of the optical signals throughout the network is that even slight optical dispersion effects that might appear because of the use of low-grade optical fiber will not accumulate in the system.

In the preferred embodiment of the invention, the switches 66 and 68 perform a "deadman switch" function whenever the node or its power supply is not functioning, in which any incoming message from one of the optical links 18a or 18b is shorted directly to the other one via the optical fibers labelled "optical bypass" in FIG. 4. The advantage of this feature is that the failure of a node cannot interrupt the relaying of messages throughout the network.

As shown in FIG. 4, a microprocessor 80 receives signals and transmits signals to the optical links 18a, 18b. Any received signals from the incoming optical cables 18a-2 and 18b-2 are converted from optical to electrical signals by respective optical-to-electrical converters 72, 74. Any signals generated by the microprocessor 70 for transmission on either of the outgoing fiber optic cables 18a-1, 18b-1 are converted from electrical to optical signals by respective electrical-to-optical converters 76, 78. Since the microprocessor 80 typically transmits and receives bytes of plural data bits in parallel and since the links 18 typically carry the data in bit serial form, serial/parallel data conversion between the microprocessor 80 and the "left-to-right" link comprising the fiber optic cables 18b-2 and 18a-1 is performed by a serial/parallel converter 84. Likewise, serial/parallel data conversion between the microprocessor 80 and the "right-to-left" link comprising the fiber optic cables 18a-2 and 18b-1 is performed by a serial/parallel converter 82. A node memory 86 is typically part of the memory in microprocessor 80. The node memory 86 stores the message identification number stack which is required in the distributed protocol process of FIG. 3.

Data acquisition and control processing functions 88 can be performed by the microprocessor 80. The microprocessor 80 permits the acquisition and control functions 88 to interface with the network of FIG. 2. The structure of the software and hardware embodied in the acquisition and control functions 88 is largely independent of the operation of network of FIG. 2. For reasons of efficiency, hardware attached to the microprocessor 80 performs channel encoding and decoding of data to be transmitted on or received from the optical links 18a, 18b. In the preferred embodiment of the invention, it is anticipated that the links 18 will employ a differential Manchester code. Therefore, the microprocessor 80 performs or manages other hardware not shown in FIG. 4 which performs differential Manchester encoding and decoding. The microprocessor 80 also performs other tasks necessary to interface with the network. For example, the microprocessor 80 performs the distributed protocol control process referred to above in connection with to FIG. 3.

One advantage is that the data acquisition and control functions 88 may be modified to add new power monitoring or control function, for example, without requiring any changes in the network of FIG. 2. It may be necessary to provide additional instructions i the microprocessor 80 to enable it to communicate with the additional functions. As a result, the network of FIG. 2 may be continually improved by the addition and refinement of power monitoring and control functions at any or all node sin the network during the lifetime of the network. More importantly, new power monitoring and control software and hardware for insertion in the acquisition and control apparatus 88 can be developed any time during the life of the network independently and competitively for purchase and installation by the electric utility company owning the network, provided the independent developers are appraised of such details as the architecture of the microprocessor 80.

Some examples of peripheral monitoring and control functions for the acquisition and control apparatus 88 are illustrated in FIG. 4. For automatic electric power distribution control, each node may have high voltage apparatus at an adjacent point in a power line coextensive with the optical links 18a, 18b. The high voltage apparatus is controlled by a peripheral controller 94 which receives command signals generated by the data acquisition and control apparatus 88 through a signal conversion device 96. The conversion device 96 may, for example, be a digital-to-analog converter. An isolator 98 provides high voltage isolation between the controller 94 and the converter 96.

Electric power monitoring may be performed by an electrical sensor 100, for example, sensing current in the power line. The output of sensor 100 is converted by a conversion device 102 to a digital format for processing by the acquisition and control device 88. If an optoelectronic sensor 104 is employed, its output is converted from an optical signal to an electrical signal by a converter 104 (which also provides high voltage isolation). The converted electric signal is converted to a digital format by a conversion device 108 for processing by the acquisition and control apparatus 88.

In modifying the acquisition and control apparatus, additional processors may be installed as additional elements of the apparatus 88 with new software governing their operation in accordance to implement the added functions. Thus, the acquisition and control apparatus 88 may include a number of microprocessors and memories, for example.

Figure 5:
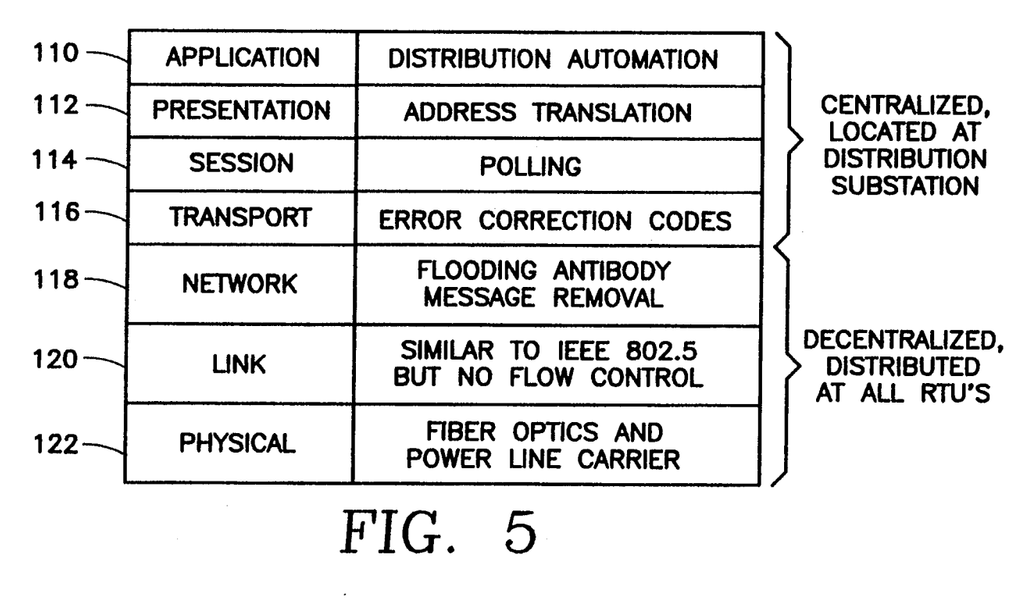
FIG. 5 illustrates an architecture for implementing the process of FIG. 3 in the network of FIG. 2.

The architecture of the node of FIG. 4 is illustrated in FIG. 5. The functions of the node, which may be implemented with the microprocessing devices 80 and 88 with pre-programmed micro-instructions or software, comprise seven layers: an application layer 110, a presentation layer 112, a session layer 114, a transport layer 116, a network layer 118, a link layer 120 and a physical layer 122. In the preferred embodiment of the invention, each of the layers except the physical layer 122 is implemented as software or a set of program instructions stored in the memories of appropriate node processors. The order of these layers is consistent with the well-known Open System Interconnection (OSI) model of the International Standards Organization (ISO) (published in Zimmerman, H., (1980) "OSI Reference Model—the ISO Model of Architecture for Open Systems Interconnection", *IEEE Transactions on Communications*, Vol. COM-28, No. 4, April, pp. 425–432).

In the invention, the applications layer 110 consists of the control and monitoring functions of power distribution system operation, or can be other functions in other applications of the present invention. As described previously herein, the polling function performed by the master units 14 permits all communication control in the network of FIG. 2 to be concentrated in the master units 14. Therefore, the applications layer 110 is likewise concentrated in the master units 14. In the preferred embodiment, the applications layer is implemented as a set of program instructions stored in the memory of the processor of each master unit 14. If the network of FIG. 2 is associated with an electrical power distribution network, then the applications program instructions carry out processes for the master unit 14 to instruct appropriate ones of the nodes 16 in its zone to monitor and report certain power conditions at remote locations and to perform certain power control functions. In this embodiment, the remote nodes 16 would store only a few of the applications layer program instructions in order to execute appropriate commands from their master unit 14. The presentation layer 112 converts data descriptions used by applications software in the application layer 110 into data addresses recognized by lower layers in the architecture of FIG. 5. The presentation layer is implemented in the microprocessor 80. The session layer 114 performs the polling function described above facilitated by the steps of blocks 60, 62 and 64 in FIG. 3 and is also implemented in the microprocessor 80. The transport layer 116, in one embodiment, may perform error detection and correction and is likewise implemented in the microprocessor 80. The network layer 118 is implemented in the microprocessor 80 and performs the distributed protocol control process of the steps of blocks 48, 50, 52 and 54 in FIG. 3. This process floods the network of FIG. 2 with many copies of the same message by virtue of the message replication operation performed by the nodes 16 or 20, as described hereinabove. The data link layer 120 frames the data into blocks, in accordance with well-known techniques (such as ANSI/IEEE Standard 802.3) and is implemented in hardware attached to the microprocessor 80. However, unlike the prior art, this layer issues no re-transmission requests in the event of an error. There seems little to be gained by retaining the conventional technique of message receipt acknowledgement. Since fiber optic links generally have a bit error rate of $10^{-9}$ or better, the probability of sending an error-free message of 1000 bits in the network of FIG. 2 is $$(1-10^{-9})^{1000},$$

which is a success probability of 99.99990%. It therefore seems inherently wasteful to devote any amount of effort to acknowleding successful reception of data.

Figures 6, 7:
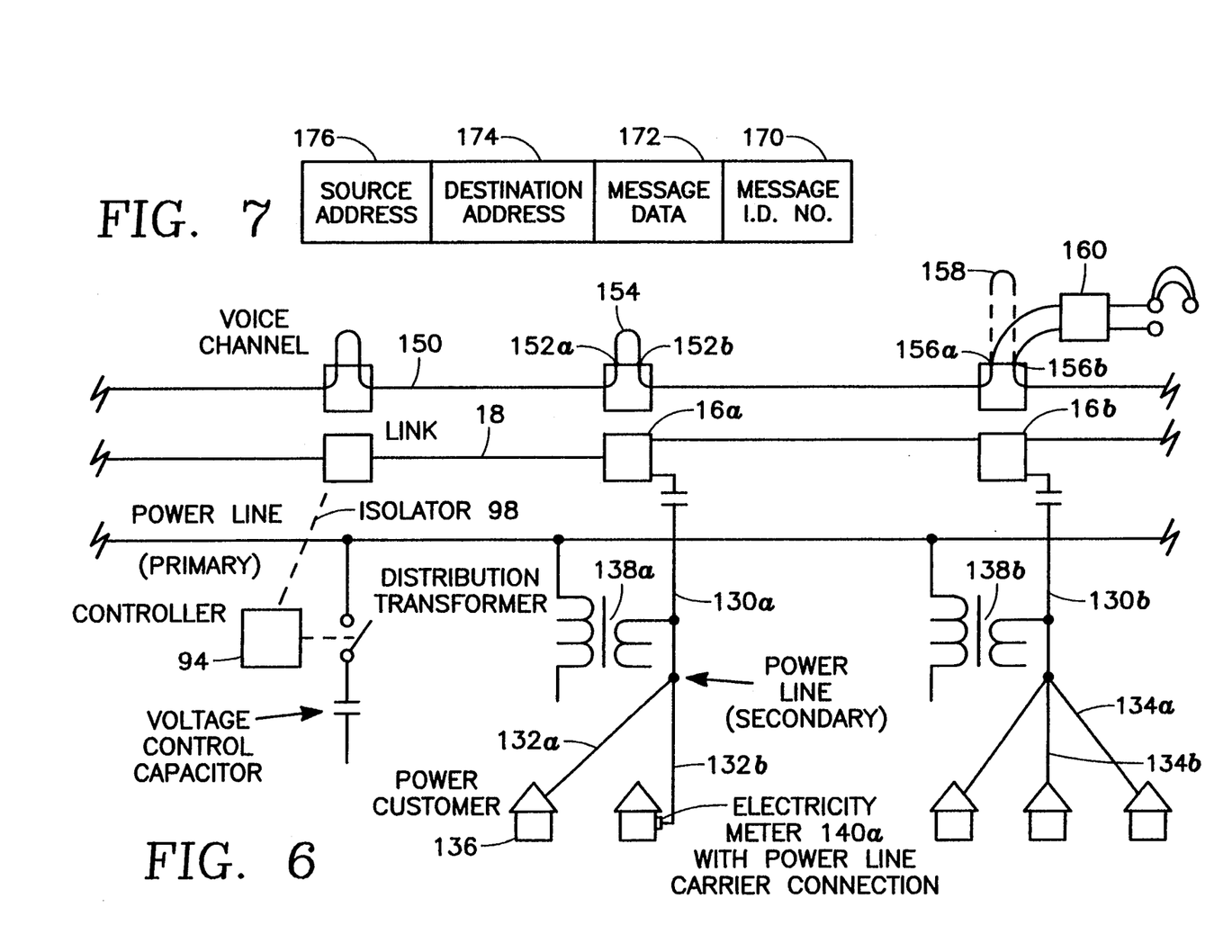
FIG. 6 illustrates one embodiment of the invention including a hybrid dual-level network and a fiber-optic voice channel.
FIG. 7 illustrates a preferred block format for messages employed in the embodiment of FIG. 2.

The physical layer 122 includes the fiber optic links 18 of FIG. 2 and also includes non-fiber optical low speed links. Therefore, in one embodiment of the invention, the physical layer is a hybrid, as illustrated in FIG. 6. The primary or fiber optic network consists of the fiber optic links 18 and the remote nodes 16 of FIG. 6, corresponding to the network of FIG. 2. The secondary or non-fiber optic network consists of the power line carrier input/outputs 130a and 130b of the primary nodes 16a, 16b, and the secondary power liens 132a, 134a, 132b, 134b connecting each power customer 136 wit a respective stepdown transformer 138a, 138b. Sensors 140 at the customers 136 report their findings via power line carrier to the appropriate node 16a, 16b. If the node 16a obtains a reading from a secondary monitor 140a, for example, it reports this reading to its local master unit 14 (not shown in FIG. 6).

The advantage of the hybrid nature of the physical layer 22 is that it enables the continued use of existing load-control and meter-reading hardware, which in turn implied minimum need to enter the customer's premises for installation. Further, communication into the home can be compatible with other communication applications of home wiring (for example the PLBus of the Electronic Industries Association (EIA) Home Automation Standard). An EIA PLBus interface at each distribution transformer would allow the utility company to accomplish far more control than simple management of one load. Not only could there be the capability of emergency load-shedding, but a solution to cold load pickup problems would be available. Other features, such as re-setting clocks in subscribers' homes after power failures, may also be developed.

In cost terms, a hybrid of this kind is certain to be competitive if more than one function is to be performed by the distribution automation system. Feeder automation functions can be implemented competitively and demand side management can be added at extremely low cost. The small size of the network to be covered by the DLC or home wiring system on the non-fiber optic links (typically 3 or 4 homes) greatly eases its communications requirements. Very low power, inexpensive modules operating at about 120 kHz are widely available, and signalling speeds up to 1200 baud are possible. The incremental cost of adding this capability and other functions at the customer level would be minimized.

For reasons of cost, the fiber optic links 18 are preferably multimode fibers with near infrared LED transmitters operating at a bit rate of between 10 and 15 MHz. The non-fiber optic links in the secondary circuits employ low-power power line carrier transmissions, as discussed above.

As described previously herein, the network of FIG. 2 is virtually immune to the failure any link 18 by virtue of the message flooding feature and is virtually immune to the failure of any node by virtue of the optical bypass feature. Therefore, the preferred embodiment of the invention includes diagnostic procedures for detecting and locating broken links or inoperative nodes. One set of procedures employs only the fiber optic or primary network illustrated in FIG. 2. In accordance with this set of procedures, a master unit 14 wishing to detect and locate node or link failures in its zone broadcasts a message instructing each node 16 receiving it to execute a program that tests all fiber links 18 connected to each one of the nodes 16 or 20, and transmits the result to the master unit 14. This test involves the use of a form of message that is not flooded into the entire network. The foregoing steps are then repeated after a predetermined period of time and any differences are noted. If a fiber optic link 18 anywhere in the zone happens to break during this time period, the master unit 14 will detect this. In most cases, it is possible to uniquely pinpoint the particular link 18 which has broken. If a node 16 has failed during this time period, the master unit 14 will detect this too. The master unit 14 will detect that the address of the inoperative node is missing from the latest list of responses. The new information uniquely pinpoints the failed node 16. Thus, in the preferred embodiment of the invention, the master unit 14 periodically elicits a set of responsive messages from the nodes 16 in its zone and analyzes each new list of responsive messages so as to detect and pinpoint any node failures or link failures.

In the hybrid embodiment of FIG. 6, an additional type of diagnostic process may be employed to detect any interruption of the power lines. This is accomplished in one example by the node 16a commanding the power line carrier input/output or secondary communication device 130a to broadcast a unique message on the power line 132a. The node 16b then senses whether the other power line carrier input/output or secondary communication device 130b receives this unique message via power line carrier. If not, there is an interruption in the power lines somewhere between the two secondary communication devices 130a and 130b. This information is then relayed by the node 16b back to the master unit 14.

In a preferred embodiment of the invention illustrated in FIG. 6, a fiber optic voice channel is provided by a voice-dedicated fiber optic 150 which follows the path of all of the fiber optic links 18 in the network of FIG. 2. Connection to the fiber optic cable 150 is provided adjacent each node 16. For example, near the node 16a, the fiber optic cable 150 is interrupted at a pair of serial terminals 152a, 152b which are shorted together by a removable modular fiber optic interrupt connector 154. Similarly, near the node 16b, the fiber optic cable 150 is interrupted by a pair of serial terminals 156a, 156b. However, their modular fiber optic interrupt connector 158 has been removed (as shown in FIG. 6) and replaced by a portable modular fiber optic voice handset 160 which is connected across the two terminals 156a, 156b. Thus, a continuous path is maintained along the entire length of the voice-dedicated fiber optic cable 150 at each interruption by either a modular interrupt connector 154 or 158 or by a portable handset 160.

FIG. 7 illustrates one exemplary format for the messages communicated in the network of FIG. 2. Each message is a serial packet of bits of which the first block 170 specifies the message's unique identification number, the second block 172 contains the message data, the third block 174 specifies the destination address and the fourth block 176 specifies the source address of the message (i.e., a particular node 16 or 20 or master unit 14).

In summary, the invention provides the following advantages:

1) The flooding approach provides maximum communications reliability, even in the event of partial system failure. It also guarantees that messages are transmitted over the shortest possible route, minimizing transmission delay.
2) Polling by the master units 14 solves contention issues, and allows the master unit to allocate priorities dynamically if necessary.

3) The antibody process performed by the nodes ensures efficient removal of messages from the network, making it available for communicating further messages with minimum delay.
4) The use of error detection codes obviate the need for node-to-node handshaking. This means that node processor time and communications link time are not affected by the details of communications problems.
5) Adoption of the definitions and formats of IEEE 802 in the data link layer 120 mean that a good deal of the detailed design of the system is already standardized.
6) The fiber optic cable used is all-dielectric, a useful feature in the vicinity of high voltage power lines. Further, the communications channel is unaffected by electromagnetic interference from the power line or other sources.
7) The bit rate of the fiber optic network of FIG. 2 is high enough that a considerable spare communications capacity exists, allowing for the development of new functions in the future. However, it is not so high that costs are increased by the need for single-mode or high performance components.
8) Centralizing the higher layers in the architecture of FIG. 5 and decentralizing the lower layers allows for the efficient development of applications, and should stimulate competition in both hardware and software.

While the invention has been described in detail by specific reference to preferred embodiments thereof, it is understood that variations and modifications thereof may be made without departing from the true spirit and scope of the invention.

What is claimed is:

1. A communication network comprising:
   a plurality of remote nodes, each of said remote nodes comprising node processor means for repeating received messages addressed to others of said nodes;
   a plurality of link means for connecting said plural nodes in multiple paths, said nodes being divided among a plurality of zones containing plural nodes; and
   some of said remote nodes comprising intersection nodes connected by respective link means to nodes in different ones of said paths;
   said communication network further comprising one master node for each one of said zones, said master node being connected by respective link means to at least one of the remote nodes in the corresponding zone, said master node comprising master node processor means comprising:
   polling means for transmitting a message authorizing a particular one of the remote nodes to transmit a new message originated by the particular one node; and
   wherein the node processor means of each of said remote nodes comprise means for permitting transmission of a new message upon receipt of a message authorizing transmission of a new message.

2. The communication network of claim 1 wherein said master node processor means governing one zone further comprise:
   means responsive upon detection of failure of a master node in another zone for broadcasting a change-over message instructing the nodes in the other zone to respond to messages originated in the one zone.

3. The communication network of claim 1 wherein said communication network is co-extensive with an electrical power distribution network, at least some of said remote nodes further comprising power distribution automation apparatus and said master nodes comprising power substation control units.

4. The communication network of claim 3 wherein said distribution automation apparatus comprises at least one of:
   sensing means for monitoring a parameter of said electrical power distribution network near the node, and
   regulation means for controlling power flow in said power distribution network near said node.

5. The communication network of claim 4 wherein said processor means of each of said master nodes comprises automation processing means for executing a set of stored application program instructions to manage the distribution automation apparatus of the nodes located in the zone of the corresponding master node.

6. The communication network of claim 5 wherein said automation processing means in each of said master nodes executes said instructions to transmit control messages to remote nodes in response to messages received from remote nodes.

7. The communication network of claim 3 further comprising a set of secondary nodes connected to respective ones of said remote nodes by secondary links, wherein said link means connecting said remote nodes comprise fiber optic cables and said secondary links comprise relatively low bandwidth non-fiber optic links.

8. The communication network of claim 7 wherein said power distribution network comprises a high-voltage primary circuit and a plurality of low-voltage secondary circuits receiving power through step-down transformer means from said primary circuit, wherein said secondary nodes are co-located with respective ones of said secondary circuits, said secondary links comprising power line carrier means for coupling between said second nodes and said remote nodes through said primary and secondary circuits.

* * * * *